Patented July 5, 1938

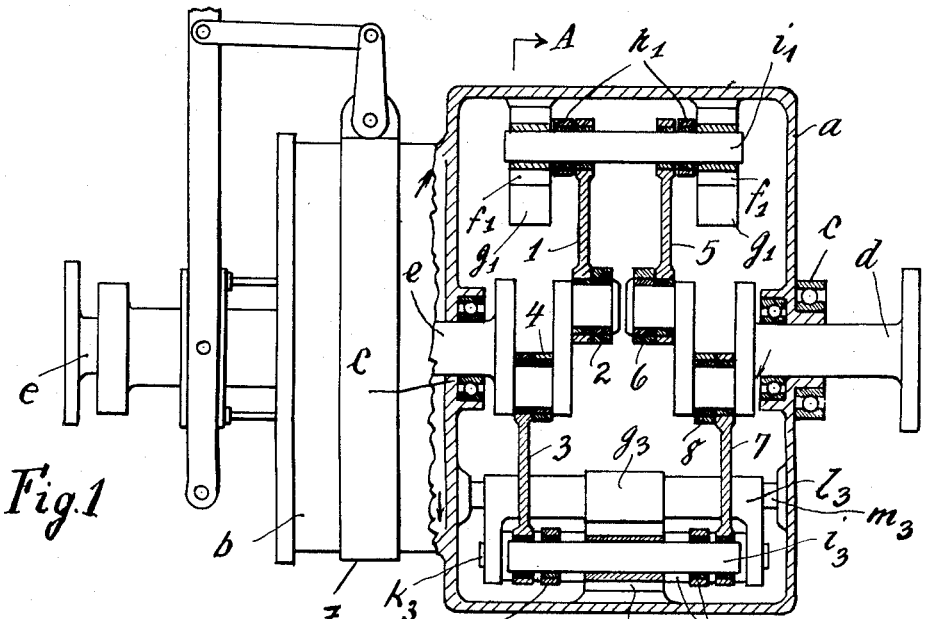

2,122,541

UNITED STATES PATENT OFFICE 2,122,541

REVERSING GEAR

Otto Solterbeck, Neuendorf, near Elmshorn, and Julius Kreisinger, Hamburg, Germany Application September 8, 1936, Serial No. 99,866
In Germany August 17, 1936

1 Claim. (Cl. 74—68)

This invention relates to a reversing gear which is intended particularly for driving ships. Apart from the known toothed wheel gears, gears have been proposed in which two coaxial crank shafts are provided both of which are carried by a casing which can be either stopped by a brake band or coupled with the two crank shafts. It has already been proposed to guide in such gears the free ends of the driving rods connected to the cranks by connecting them either to sliding pieces which carry out a reciprocating movement in the casing or to rocking arms which are oscillatable about a stationary point in the casing. These constructions are open to the objection that, even if the cranks or cams are arranged with respect to each other at an angle of 180°, shocks still occur, the cause of which is that the driving rods arranged for the movement and power transmission and especially the guiding thereof, do not give kinematically perfect lines of movement. On this account it was hitherto not possible to use these gears in practice.

In order to attain this perfect guiding of the free ends of the rods, these free ends are, according to the invention, guided in radial direction with respect to the driving and driven shafts in rectilinear guide tracks provided especially for this purpose and they are also linked to one end of rocking arms which are pivotally mounted indirectly on the case at their other end. The radial-rectilinear movement of the driving rod connecting points on the rocker levers is brought into kinematic agreement with the arcuate curve of movement of the rocker lever, owing to this rocker lever being not suspended directly on the gear case but in a short lever oscillatable about a pin provided on the inner surface of the case wall. This is what has been termed "mounted indirectly".

An embodiment of the invention is illustrated diagrammatically by way of example in the accompanying drawing, in which:—

Fig. 1 is an elevation of the gear, partly in axial section.

Fig. 2 is a section on the line A—B in Fig. 1.

$a$ is the gear case, provided with bearings $c$ for the driving shaft $d$ and the driven shaft $e$. $d$ is connected to the driving crank shaft of an engine (not shown) and has a pair of crank pins arranged set at 180°, $e$ the driven crank shaft on the propeller side having a pair of crank pins likewise set at 180°. Connecting rods 5, 6, 7, 8 are hingedly connected to the driving shaft $d$ and connecting rods 1, 2, 3, 4 are hingedly connected to the driven shaft $e$. The rods 1 and 7, 2 and 8, 3 and 5, 4 and 6 are connected respectively to sliding blocks $f_1$, $f_2$, $f_3$, $f_4$ in straight guide tracks $g_1$, $g_2$, $g_3$, $g_4$ rigidly connected with case $a$. A pair of sliding blocks may be provided with a pair of guide tracks, as shown for the pin $i_1$ in Fig. 1, or a single block at the centre of the pin may be arranged with a single guide track, as shown for the pin $i_3$. Rocking arms $h_1$, $h_2$, $h_3$, $h_4$ are connected, respectively to the pins $i_1$, $i_2$, $i_3$, $i_4$ of the sliding blocks $f_1$, $f_2$, $f_3$, $f_4$. The rocker levers $h_1$, $h_2$, $h_3$, $h_4$ are fulcrumed at the points $k_1$, $k_2$, $k_3$, $k_4$ of compensating levers $l_1$, $l_2$, $l_3$, $l_4$ respectively which are fulcrumed, respectively, at $m_1$, $m_2$, $m_3$, $m_4$ in the case $a$. The rocking arms $h$ and the compensating levers $l$ are preferably U-shaped, as seen for the arm $l_3$ in Fig. 1.

The operation of the gear is as follows:—

The driving shaft $d$ is supposed to rotate clockwise, and the case $a$ is supposed to have been arrested by the brake band $z$. The driven shaft $e$ is rotated anti-clockwise, as will presently appear. Oppositely directed forces act on the rods which are connected to the same sliding-block pin $i$. Thus, rod 5 is under tension, and rod 1 is under compression, and a tilting moment is exerted on the pin $i_1$, whose leverage is considerable, as the rods 1 and 5 for obvious reasons must be pitched far apart. Similarly, rod 7 is under tension and rod 3 is under compression, and these rods are still farther apart. It has been attempted to prevent the edging of the sliding blocks $f$ under the action of such tilting moments by providing additional guide tracks for the sliding blocks but this was found to be practically impossible, as the sliding blocks still had the tendency to edge. Experience has shown that with guide tracks only a satisfactory operation of the gear is impossible. This edging is eliminated by the rocking levers $h_1$—$h_4$ pivotally connected with the pins $i_1$—$i_4$ of the sliding blocks $f_1$—$f_4$. The arms constitute forks each of which is pivotally mounted on one of the compensating levers $l_1$—$l_4$ at $k_1$—$k_4$. By these means, the pins $i_1$—$i_4$ are supported by the fork arms of the rocking arms $h_1$—$h_4$, as shown in Fig. 1 for the pins $i_1$ and $i_3$.

If the pivot points $k_1$—$k_4$ where the rocking arms $h_1$—$h_4$ are connected to the compensating levers $l_1$—$l_4$, were provided, i. e. if the rocking arms were rigidly fulcrumed in the case $a$, they would interfere with the straight-line movement of the sliding blocks $f$, as their ends would move on arcs of circles about their fixed fulcrum points. This difficulty is overcome by the indirect mounting of the rocking arms $h$ on the compensating levers $l$.

We claim:—

A reversing gear, especially for ships' drives, comprising in combination a case, two crank shafts coaxial in said case, crank pins on said shafts, connecting rods each connected at one end with the crank pins of said crank shafts, sliding blocks one connected to the other end of each of said connecting rods, radial rectilinear guide tracks in said case each adapted to guide one of said sliding blocks, and rocking arms indirectly mounted on said case at one end and each linked at its other end with one of said rods.

OTTO SOLTERBECK.
JULIUS KREISINGER.